United States Patent [19]

Guyton

[11] 4,258,925
[45] Mar. 31, 1981

[54] O-RING GROOVE

[75] Inventor: Glen Guyton, Tulsa, Okla.

[73] Assignee: Guyton Manufacturing Company, Tulsa, Okla.

[21] Appl. No.: 951,178

[22] Filed: Oct. 13, 1978

[51] Int. Cl.³ .......................................... F16K 15/03
[52] U.S. Cl. .................................... 277/29; 137/527; 251/DIG. 1; 251/356
[58] Field of Search .................... 251/356, DIG. 1; 137/527; 277/168, 169, 170, 171, 27, 29; 285/DIG. 19

[56] References Cited

U.S. PATENT DOCUMENTS

| 874,652 | 12/1907 | Bailey | 277/169 |
|---|---|---|---|
| 2,621,885 | 12/1952 | Schmitt | 251/DIG. 1 |
| 2,704,650 | 3/1955 | Rand | 277/168 |
| 3,131,906 | 5/1964 | King | 251/315 |
| 3,155,368 | 11/1964 | Shafer | 251/315 |
| 3,184,247 | 5/1965 | Leutwyler | 277/170 |
| 3,198,481 | 8/1965 | Bryant | 251/DIG. 1 |
| 3,202,178 | 8/1965 | Wolfe | 251/DIG. 1 |
| 3,901,434 | 8/1975 | Wright | 277/29 |
| 3,951,381 | 4/1976 | Whitener | 251/DIG. 1 |

FOREIGN PATENT DOCUMENTS

| 719162 | 10/1965 | Canada | 251/DIG. 1 |
|---|---|---|---|
| 1450671 | 3/1969 | Fed. Rep. of Germany | 251/DIG. 1 |
| 753641 | 7/1956 | United Kingdom | 285/DIG. 19 |

*Primary Examiner*—Martin P. Schwadron
*Assistant Examiner*—A. Michael Chambers
*Attorney, Agent, or Firm*—Head & Johnson

[57] ABSTRACT

A groove particularly designed and constructed for receiving an O-ring sealing member therein, and particularly for use on the closure member of a check valve. The groove comprises an annular recess provided on one face of the closure member, and having a cross-sectional configuration generally similar to a dovetail groove. One side of the groove is inwardly tapered to provide an undercut for the groove, and the opposite side of the groove is of an arcuate configuration complementary to the configuration of the outer periphery of the O-ring seating within the groove. When the O-ring is in a sealing position within the groove, there will be no scrubbing of the outer periphery of the O-ring against the inner periphery of the groove since the groove snugly receives the O-ring against the inner periphery of the groove since the groove snugly receives the O-ring against the arcuate sidewall thereof.

2 Claims, 2 Drawing Figures

O-RING GROOVE

BACKGROUND OF THE INVENTION

1. Field of the Invention

This invention relates to improvements in O-ring sealing structures and more particularly, but not by way of limitation, to a groove for receiving the O-ring therein in a manner providing for increased sealing efficiency and prolonged life for the O-ring.

2. Description of the Prior Art

O-rings are in widespread use today for sealing between adjacent surfaces, and particularly in use in combination with the closure members of valves, such as check valve. Many of the clappers or closure members of check valves are provided with an annular groove on one face thereof for receiving an O-ring sealing member therein. A portion of the outer periphery of the O-ring normally extends beyond the outer surface of the closure member for engagement by a valve seat or the like in the closed position of the closure member. The pressure of the valve seat on the O-ring forces the O-ring into the groove and compresses the yieldable material of the O-ring into the configuration of the groove.

The usual O-ring groove is of a cross-sectional configuration similar to a dovetail groove wherein the opposite sidewalls of the groove are inwardly tapered to provide an area of compression for the O-ring and reduce accidental loss of the O-ring from the groove upon opening of the closure member. When the O-ring is compressed into the groove, considerable scrubbing occurs between the outer periphery of the O-ring and the inner periphery of the groove, and the O-rings are relatively quickly worn sufficiently to require replacement thereof. Not only is the sealing efficiency of the O-ring reduced by the scrubbing action, but the frequent replacement of the worn O-rings is time consuming and expensive.

SUMMARY OF THE INVENTION

The present invention comprises a novel O-ring groove which is particularly designed and constructed for overcoming the foregoing disadvantages. The groove is of the usual annular configuration corresponding in diameter substantially to the diameter of the O-ring to be inserted therein, as is well known. One sidewall of the groove is inwardly tapered in much the same manner as the present day O-ring grooves to provide a compression area for the O-ring during the closed position of the clapper or closure member of the valve. However, the opposite sidewall of the groove is of an arcuate configuration complementary to the arcuate cross-sectional configuration of the outer periphery of the O-ring. Thus, when the O-ring is inserted into the groove, one side of the O-ring rests snugly against the arcuate sidewall of the groove. Whereas the arcuate sidewall of the groove may be either the outer periphery thereof or the inner periphery thereof, it has been found preferable to provide the inner periphery of sidewall with the arcuate cross-sectional configuration. When the closure member is moved against the valve seat, or the like, the O-ring is forced into the groove, and the compression area in the groove provides sufficient volume for receiving the deformed material of the O-ring which is compressed into the groove. However, there is little or no scrubbing effect between the O-ring and the inner walls of the groove because of the complementary arcuate cross-sectional configurations of the O-ring and the one sidewall of the groove. The groove is simple and efficient in use and durable in construction.

DESCRIPTION OF THE PREFERRED EMBODIMENT

Figure 1:
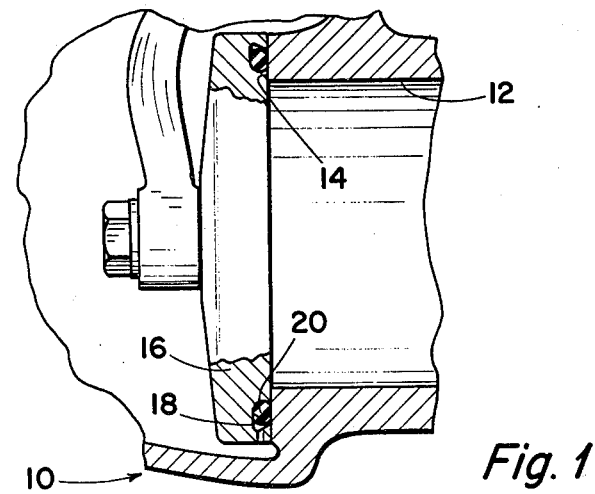
FIG. 1 is a broken sectional elevational view of a closure member of a check valve, and having an O-ring groove embodying the invention provided therein.

Referring to the drawings in detail, reference character 10 generally indicates a check valve, or the like, having a flow passageway 12 provided therein for passage of fluids therethrough, as is well known. An annular valve seat 14 is normally provided within the valve 10 in the proximity of one end of the passageway 12 for alternately receiving a pivotal clapper or closure member 16 thereagainst to provide open and closed positions for the valve 10. It is the usual practice to provide a suitable sealing member between the closure member 16 and the valve seat 14 for precluding leakage of fluid therebetween in the closed position of the valve. It is common practice to provide an annular O-ring groove 18 on one of the sealing faces, such as on one face of the closure member, for receiving an O-ring sealing member 20 therein. In the closed position of the clapper member as shown in FIG. 1, the O-ring 20 is in engagement with the valve seat 14, and there is usually a metal-to-metal engagement between the inwardly directed face of the closure member and the valve seat. As a consequence, the O-ring is compressed into the groove 18 during the sealing engagement between the clapper 16 and valve seat 14.

Figure 2:
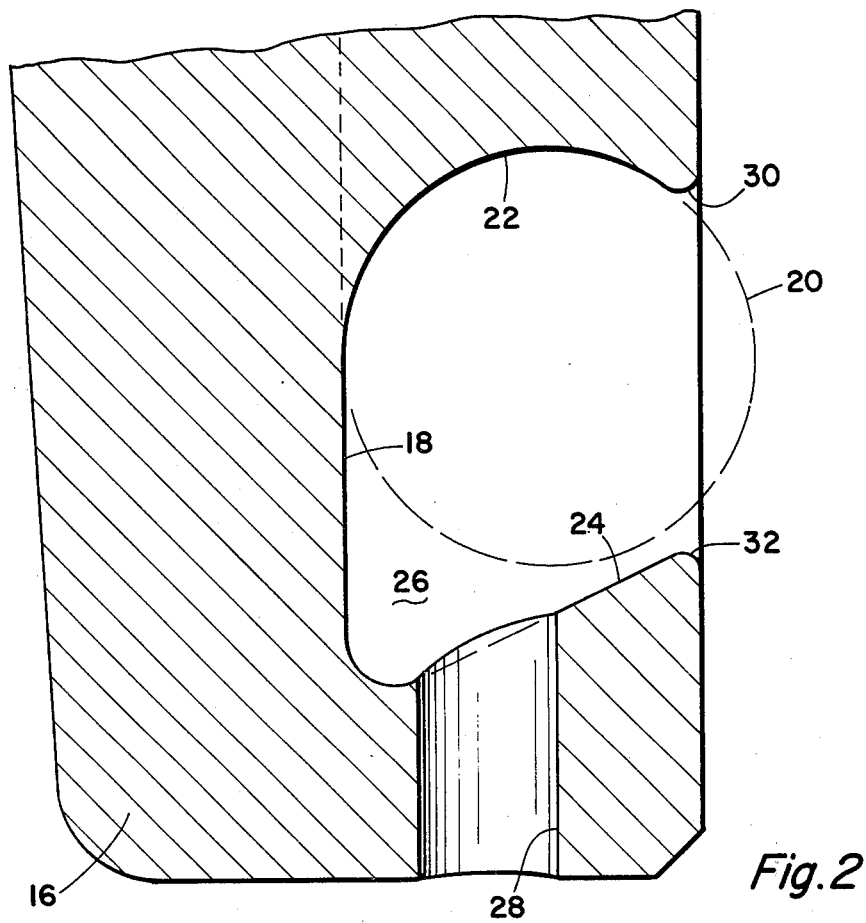
FIG. 2 is an enlarged sectional elevational view of an O-ring groove embodying the invention.

The annular groove 18 as shown herein is of a diameter substantially corresponding to the diameter of the O-ring to be seated therein, with the inner sidewall 22 being of a diameter complementary to the inner diameter of the O-ring 16, and the outer sidewall 24 thereof being of diameter slightly larger than the outer diameter of the O-ring 20 in the relaxed or normal position thereof, as particularly shown in FIG. 2. One of the sidewalls, such as the sidewall 24, of the groove 18 is inwardly tapered or bevelled to provide a compression area 26 for the O-ring 16 in a sealed or compressed position thereof. In addition, at least one radially extending bore 28 extends from the outer periphery of the closure member 16 to the groove 18 to provide communication between the interior of the groove and the exterior of the closure member for a purpose as will be hereinafter set forth.

The opposite sidewall of the groove 18, such as the sidewall 22, is of arcuate cross-sectional configuration, as particularly shown in FIG. 2. The configuration of the sidewall 22 is complementary to the cross-sectional configuration of the outer periphery of the O-ring 20 for snugly receiving the O-ring thereagainst. The configuration of the sidewalls 22 and 24 cooperate with the configuration of the O-ring for securely retaining the O-ring within the groove during opening and closing of the valve clapper 16 against the valve seat 14. Of course, it is also preferable that the outer edges 30 and 32 of the groove 18 be rounded or otherwise blunted for precluding accidental cutting or other damage to the O-ring during use of the valve 10.

When the clapper member 16 is in the open position thereof the O-ring 20 disposed within the groove 18 is in its normal relaxed position and protrudes slightly beyond the outer face of the closure 16 as particularly shown in FIG. 2. In this position, the inner periphery of the O-ring 20 is in snug engagement with the sidewall 22 of the groove 18, and the outer periphery of the O-ring 20 is not in engagement with the sidewall 24. However, the contour of the sidewall 22 substantially precludes accidental loss of the O-ring from the groove 18 during opening and closing of the valve.

When the closure member 16 is in the closed position thereof against the valve seat 14 as shown in FIG. 1, the O-ring is compressed to a position substantially totally contained within the confines of the groove 18. The resiliency or yieldability of the material from which the O-ring is normally constructed permits the O-ring to deform and compress into the area 26, thus assuming a cross-sectional configuration generally corresponding to the cross-sectional configuration of the groove 18. The port or ports 28 permit the escape of any air or fluids which may be trapped between the O-ring 20 and the bottom of the groove 18, thus assuring an efficient compression of the O-ring into the groove.

The novel groove 18 is particularly designed for use only under conditions wherein the pressure is directional, that is the pressure is from one direction only across the seal. The groove is used on the downstream side whereby the pressure acting on the 0-ring in the groove is always from the "dove-tail" wall and toward the arcuate wall of the groove. It will thus be readily apparent that substantially all of the deforming of the O-ring will be at the outer periphery thereof, or in the proximity of the sidewall 24 of the groove 18. The outer periphery of the O-ring 20 will remain substantially stationary with respect to the sidewall 22, thus substantially eliminating or greatly reducing any scrubbing action of the O-ring against the arcuate wall of the groove. Thus, the useful life of the O-ring is greatly prolonged, without any detriment to the efficient sealing qualities normally present with the use of an O-ring sealing member.

From the foregoing it will be apparent that the present invention provides a novel groove for receiving an O-ring therein and supporting the O-ring in a manner for greatly reducing detrimental abrasion or scrubbing of the O-ring against the walls of the groove. Whereas the particular illustration of the groove and O-ring shown herein is in a clapper or closure member of a check valve, it is to be understood that the groove may be utilized under substantially any conditions wherein the pressure is directional as hereinbefore set forth.

Whereas the present invention has been described in particular relation to the drawings attached hereto, it should be understood that other and further modifications apart from those shown or suggested herein may be made within the spirit and scope of this invention.

What is claimed is:

1. An O-ring sealing means interposed between a pair of abutting surfaces and comprising an annular groove provided in one of said surface for receiving an O-ring sealing means therein and defined in cross section by an arcuate portion conterminous with an adjacent first flat portion which is conterminous with an adjacent tapered portion which is conterminous with an adjacent second flat portions, said second flat portions and said arcuate portion being disposed diametrically opposite one another in relation to the center of the annular groove and being disposed substantially parallel with respect to one another, said tapered portion providing an area of compression for the O-ring sealing means when said O-ring sealing means is engaged with the other of said abutting surfaces, the arcuate portion being of a configuration corresponding to the cross-sectional configuration of the O-ring sealing means for snugly receiving one side of the O-ring sealing means thereagainst, and including at least one relief portion disposed in said second flat portion for providing communication with the compression area of the groove for facilitating compression of the O-ring sealing means into the compression are during a sealing position of the O-ring sealing means against the second of said abutting surfaces.

2. An O-ring sealing means interposed between a pair of abutting surfaces as set forth in claim 1 wherein the outer edges of the groove are arcuate for reducing damage to the O-ring.

* * * * *